United States Patent [19]

Kitayama

[11] Patent Number: 5,719,841
[45] Date of Patent: Feb. 17, 1998

[54] METHOD AND APPARATUS FOR RECORDING AND/OR REPRODUCING FROM RECORDING MEDIA

[75] Inventor: Atsushi Kitayama, Kanagawa, Japan

[73] Assignee: Sony Corporation, Tokyo, Japan

[21] Appl. No.: 531,474

[22] Filed: Sep. 21, 1995

[30] Foreign Application Priority Data

Sep. 30, 1994 [JP] Japan ................................ 6-259720

[51] Int. Cl.$^6$ ................................................. G11B 7/00
[52] U.S. Cl. ................................................. 369/59
[58] Field of Search ........................... 369/32, 59, 60, 369/48, 47, 275.3

[56] References Cited

U.S. PATENT DOCUMENTS

| | | | |
|---|---|---|---|
| 5,485,442 | 1/1996 | Furukawa et al. | 369/47 |
| 5,497,362 | 3/1996 | Aizawa | 369/53 |
| 5,592,449 | 1/1997 | Goto et al. | 369/47 |

*Primary Examiner*—Nabil Hindi
*Attorney, Agent, or Firm*—Limbach & Limbach L.L.P.

[57] ABSTRACT

An apparatus for recording on and/or reproducing from a recording medium such as a disc-shaped recording medium having a code area in which character code data for displaying character information associated with the information recorded in a recording area on a display portion or the like can be recorded includes an input portion, conversion portion, and a recording and/or reproducing portion. Plural pieces of character information of different kinds are input through the input portion. The conversion portion converts each character of the character information input from the input portion into character code data. The conversion portion adds an identifier to the character code data during the conversion. The identifier indicates that a character string in the character information input by the input portion consists of kana characters unlike the character string precedent thereto. The recording and/or reproducing portion receives the character code data from the conversion means and records and/or reproduces information and character code data on and/or from the recording medium.

21 Claims, 13 Drawing Sheets

ALPHABET/KATAKANA CONVERSION TABLE

| a | i | u | e | o |
|---|---|---|---|---|
| ア | イ | ウ | エ | オ |
| A | I | U | E | O |
| ア | イ | ウ | エ | オ |
| KA | KI | KU | KE | KO |
| カ | キ | ク | ケ | コ |
| SA | SI | SU | SE | SO |
| サ | シ | ス | セ | ソ |
| TA | TI | TU | TE | TO |
| タ | チ | ツ | テ | ト |
| NA | NI | NU | NE | NO |
| ナ | ニ | ヌ | ネ | ノ |
| HA | HI | HU | HE | HO |
| ハ | ヒ | フ | ヘ | ホ |
| MA | MI | MU | ME | MO |
| マ | ミ | ム | メ | モ |
| YA |   | YU |   | YO |
| ヤ |   | ユ |   | ヨ |
| RA | RI | RU | RE | RO |
| ラ | リ | ル | レ | ロ |
| WA |   |   |   | WO |
| ワ |   |   |   | ヲ |
| GA | GI | GU | GE | GO |
| ガ | ギ | グ | ゲ | ゴ |
| ZA | ZI | ZU | ZE | ZO |
| ザ | ジ | ズ | ゼ | ゾ |
| DA | DI | DU | DE | DO |
| ダ | ヂ | ヅ | デ | ド |
| BA | BI | BU | BE | BO |
| バ | ビ | ブ | ベ | ボ |
| PA | PI | PU | PE | PO |
| パ | ピ | プ | ペ | ポ |
| VU | n |   |   |   |
| ヴ | ン |   |   |   |

| ya | yu | yo | tu |
|---|---|---|---|
| ャ | ュ | ョ | ッ |

FIG. 1

| HEX | 0 | 1 | 2 | 3 | 4 | 5 | 6 | 7 |
|-----|---|---|---|---|---|---|---|---|
| 0 | | | | 0 | @ | P | ` | p |
| 1 | | | ! | 1 | A | Q | a | q |
| 2 | | | " | 2 | B | R | b | r |
| 3 | | | # | 3 | C | S | c | s |
| 4 | | | $ | 4 | D | T | d | t |
| 5 | | | % | 5 | E | U | e | u |
| 6 | | | & | 6 | F | V | f | v |
| 7 | | | ' | 7 | G | W | g | w |
| 8 | | | ( | 8 | H | X | h | x |
| 9 | | | ) | 9 | I | Y | i | y |
| A | | | * | : | J | Z | j | z |
| B | | | + | ; | K | | k | |
| C | | | , | < | L | | l | |
| D | | | - | = | M | | m | |
| E | | | . | > | N | ^ | n | |
| F | | | / | ? | O | _ | o | |

FIG.5

| | 16bit | | 16bit | | |
|---|---|---|---|---|---|
| | MSB LSB | MSB LSB | MSB LSB | MSB LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | 00000000 | 00000010 | 3 |
| | 00000000 | 00000000 | 00000000 | 00000000 | 4 |
| | 00000000 | 00000000 | 00000000 | 00000000 | 5 |
| | "M" | "I" | "N" | "I" | 6 |
| | Disc type | Rec power | First TNO | Last TNO | 7 |
| | READOUT START ADDRESS (LO$_A$) | | | Used Sectors | 8 |
| | POWER CALIBRATION AREA START ADDRESS (PC$_A$) | | | REC POWER PW2 | 9 |
| | U-TOC START ADDRESS (UST$_A$) | | | 00000000 | 10 |
| | RECORDABLE USER AREA START ADDRESS (RST$_A$) | | | 00000000 | 11 |
| DATA PORTION FOR SPECIFYING ASSOCIATED TABLES { | 00000000 | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| | 00000000 | 00000000 | 00000000 | 00000000 | 76 |
| | 00000000 | 00000000 | 00000000 | 00000000 | 77 |
| MANAGEMENT TABLE PORTION (255 PART TABLES) (01h) | START ADDRESS (TRACK #1) | | | TRACK MODE | 78 |
| | END ADDRESS | | | 00000000 | 79 |
| (02h) | START ADDRESS (TRACK #2) | | | TRACK MODE | 80 |
| | END ADDRESS | | | 00000000 | 81 |
| (03h) | START ADDRESS (TRACK #3) | | | TRACK MODE | 82 |
| | END ADDRESS | | | 00000000 | 83 |
| (FCh) | START ADDRESS | | | TRACK MODE | 580 |
| | END ADDRESS | | | 00000000 | 581 |
| (FDh) | START ADDRESS | | | TRACK MODE | 582 |
| | END ADDRESS | | | 00000000 | 583 |
| (FFh) | START ADDRESS | | | TRACK MODE | 584 |
| | END ADDRESS | | | 00000000 | 585 |
| (FFh) | START ADDRESS (TRACK #255) | | | TRACK MODE | 586 |
| | END ADDRESS | | | 00000000 | 587 |

P-TOC SECTOR 0

FIG.6

| | 16bit | | 16bit | | |
|---|---|---|---|---|---|
| | MSB      LSB | MSB      LSB | MSB      LSB | MSB      LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | 00000000 | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No | 10 |
| DATA PORTION FOR SPECIFYING ASSOCIATED TABLES | Disc | ID | P-DFA | P-EMPTY | 11 |
| | P-FRA | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| | 00000000 | 00000000 | 00000000 | 00000000 | 76 |
| | 00000000 | 00000000 | 00000000 | 00000000 | 77 |
| MANAGEMENT TABLE PORTION (255 PART TABLES) (01h) | START ADDRESS | | | TRACK MODE | 78 |
| | END ADDRESS | | | LINK INFORMATION | 79 |
| (02h) | START ADDRESS | | | TRACK MODE | 80 |
| | END ADDRESS | | | LINK INFORMATION | 81 |
| (03h) | START ADDRESS | | | TRACK MODE | 82 |
| | END ADDRESS | | | LINK INFORMATION | 83 |
| (FCh) | START ADDRESS | | | TRACK MODE | 580 |
| | END ADDRESS | | | LINK INFORMATION | 581 |
| (FDh) | START ADDRESS | | | TRACK MODE | 582 |
| | END ADDRESS | | | LINK INFORMATION | 583 |
| (FEh) | START ADDRESS | | | TRACK MODE | 584 |
| | END ADDRESS | | | LINK INFORMATION | 585 |
| (FFh) | START ADDRESS | | | TRACK MODE | 586 |
| | END ADDRESS | | | LINK INFORMATION | 587 |

U-TOC SECTOR 0

FIG. 8

| MSB       LSB | MSB       LSB | MSB       LSB | MSB       LSB | |
|---|---|---|---|---|
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| ClusterH | ClusterL | 00000001 | 00000010 | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| 00000000 | 00000000 | 00000000 | 00000000 | 7 |
| 00000000 | 00000000 | 00000000 | 00000000 | 8 |
| 00000000 | 00000000 | 00000000 | 00000000 | 9 |
| 00000000 | 00000000 | 00000000 | 00000000 | 10 |
| 00000000 | 00000000 | 00000000 | P-EMPTY | 11 |
| 00000000 | P-TNA1 | P-TNA2 | P-TNA3 | 12 |
| P-TNA4 | P-TNA5 | P-TNA6 | P-TNA7 | 13 |
| P-TNA248 | P-TNA249 | P-TNA250 | P-TNA251 | 74 |
| P-TNA252 | P-TNA253 | P-TNA254 | P-TNA255 | 75 |

- Rows 0–3: HEADER
- Rows 4–75: DATA PORTION FOR SPECIFYING CHARACTOR SLOTS
- Rows 76–587: CHARACTOR SLOT PORTION

| | | |
|---|---|---|
| | DISC NAME | 76 |
| | DISC NAME / LINK INFORMATION | 77 |
| (01h) | DISC NAME/TRACK NAME | 78 |
| | DISC NAME/TRACK NAME / LINK INFORMATION | 79 |
| (02h) | DISC NAME/TRACK NAME | 80 |
| | DISC NAME/TRACK NAME / LINK INFORMATION | 81 |
| (03h) | DISC NAME/TRACK NAME | 82 |
| | DISC NAME/TRACK NAME / LINK INFORMATION | 83 |
| (FEh) | DISC NAME/TRACK NAME | 584 |
| | DISC NAME/TRACK NAME / LINK INFORMATION | 585 |
| (FFh) | DISC NAME/TRACK NAME | 586 |
| | DISC NAME/TRACK NAME / LINK INFORMATION | 587 |

U-TOC SECTOR 1

FIG.9

ALPHABET/KATAKANA CONVERSION TABLE

| | a | i | u | e | o |
|---|---|---|---|---|---|
| | ア | イ | ウ | エ | オ |
| | A | I | U | E | O |
| | ア | イ | ウ | エ | オ |
| | KA | KI | KU | KE | KO |
| | カ | キ | ク | ケ | コ |
| | SA | SI | SU | SE | SO |
| | サ | シ | ス | セ | ソ |
| | TA | TI | TU | TE | TO |
| | タ | チ | ツ | テ | ト |
| | NA | NI | NU | NE | NO |
| | ナ | ニ | ヌ | ネ | ノ |
| | HA | HI | HU | HE | HO |
| | ハ | ヒ | フ | ヘ | ホ |
| | MA | MI | MU | ME | MO |
| | マ | ミ | ム | メ | モ |
| | YA | | YU | | YO |
| | ヤ | | ユ | | ヨ |
| | RA | RI | RU | RE | RO |
| | ラ | リ | ル | レ | ロ |
| | WA | | | | WO |
| | ワ | | | | ヲ |
| | GA | GI | GU | GE | GO |
| | ガ | ギ | グ | ゲ | ゴ |
| | ZA | ZI | ZU | ZE | ZO |
| | ザ | ジ | ズ | ゼ | ゾ |
| | DA | DI | DU | DE | DO |
| | ダ | ヂ | ヅ | デ | ド |
| | BA | BI | BU | BE | BO |
| | バ | ビ | ブ | ベ | ボ |
| | PA | PI | PU | PE | PO |
| | パ | ピ | プ | ペ | ポ |
| | VU | n | | | |
| | ヴ | ン | | | |
| | ya | yu | yo | tu | |
| | ャ | ュ | ョ | ッ | |

FIG. 10

| | CHARACTERS INPUT | TRACK NAMES RECORDED |
|---|---|---|
| (a) | ABC5de | ABC5de |
| (b) | ミニディスク | ^MINIDEiSUKU^ |
| (c) | ギリシャ | ^GIRISIya^ |
| (d) | ABCアイウエオ | ABC^AIUEO^ |
| (e) | カキクXyz | ^KAKIKU^Xyz |
| (f) | アイウエオカキク-------<br>--------ラリルレロ | EXAMPLE 1<br>^AIUEOKAKIKU-------<br>-----RA^^RIRURERO^<br>EXAMPLE 2<br>^AIUEOKAKIKU^^KEKO--<br>----- ^^RARIRURERO^ |

FIG. 11

| | TRACK NAMES RECORDED PRIOR TO INPUT | CHARACTERS INPUT (INSERTED) | TRACK NAMES RECORDED |
|---|---|---|---|
| (a) | ABC | アイウ | ABC^AIU^ |
| (b) | AIU (アイウ) | カキク | ^AIU^^KAKIKU^ |
| (c) | ABCD | サシス (INSERTED AFTER "B") | AB^SASISU^CD |

FIG. 13

| | RECORDED CHARACTERS | DISPLAYED CHARACTERS |
|---|---|---|
| (a) | ABC5de | ABC5de |
| (b) | ABC^AIU^ | ABCアイウ |
| (c) | ^KAKIKU^XYZ | カキクXYZ |
| (d) | ^GIRISIya^ | ギリシャ |
| (e) | ^GIRISYA^ | ^GIRISYA^ |
| (f) | ^GILISIya^ | ^GILISIya^ |
| (g) | ^AIUEOKAKI-------<br>------RARIRURERO^<br>(The portion sandwiched by identification characters "^" exceeds 80 bytes) | ^AIUEOKAKI-------<br>------RARIRURERO^ |
| (h) | ^AIUEOKAKI--------<br>------RA^RIRURERO | アイウエオカキ --------<br>--- ラRIRURERO |
| (i) | ^AIUEOKAKI-------<br>--RA^^RIRURERO^ | アイウエオカキ ----------<br>--- ラリルレロ |
| (j) | ^ABC^ABC^ABE^ | ^ABC^ABCアベ |

METHOD AND APPARATUS FOR RECORDING AND/OR REPRODUCING FROM RECORDING MEDIA

BACKGROUND OF THE INVENTION

1. Field of the Invention

The present invention relates to a method and apparatus for recording on and/or reproducing from a recording medium and, more particularly, to a method and apparatus for recording on and/or reproducing from recording media which allow the recording of data on character information associated with information to be recorded.

2. Description of the Related Art

Known recording and/or reproducing apparatuses capable of recording and/or reproducing information such as music include recording and/or reproducing apparatus whose recording medium is magneto-optical discs or magnetic tapes for recording audio signals as digital signals.

With recording and/or reproducing apparatuses utilizing magneto-optical discs as the recording media, a user can not only record and reproduce sounds such as pieces of music but also store the title of a disc (album title), the titles of the pieces of music recorded thereon, and the like as character information. For example, the title of a disc, the titles of the pieces of music, the name of the artist, etc. can be displayed on a display portion provided on such an apparatus during reproduction.

In the case of a recording and/or reproducing apparatus utilizing a magneto-optical disc as described above, the character information which can be normally recorded on the disc is character strings represented by ASCII codes as shown in FIG. 1. In other words, only alphabets, numerals and predetermined symbols can be recorded on a magneto-optical disc as character information.

Needless to say, it is possible to record katakana characters and the like on a disc by converting them into some codes, in addition to the characters as shown in FIG. 1. For example, although FIG. 1 shows column Nos. 2 through 7 only, in JIS (Japanese Industrial Standard)—0201 code specifications, katakana characters and symbols are specified as codes with column Nos. A through D.

However, standards in various foreign countries specify various characters for the area specified for katakana characters and the like in JIS-0201 code specifications. As a result, if katakana codes according to JIS-0201 code specifications recorded on a disc are reproduced using an apparatus in compliance with specifications of a foreign country, unexpected characters will be displayed.

If katakana characters are to be displayed in such a case, the number of characters to be processed will exceed twice the number of characters involved in the case wherein only ASCII codes are used. This increases the memory capacity required and goes against efforts toward reduction of the apparatus cost.

Under such circumstances, recording and/or reproducing apparatuses utilizing magneto-optical discs as described above as recording media have been configured so that only the ASCII codes shown in FIG. 1 can be recorded on the discs as character information.

However, if ASCII codes are used to represent character information, there is a problem in that character information in Japanese will be often very difficult to read. Assume that a Japanese piece of music "川の流れ、のよ、うに," is recorded. Then, the title of this piece of music is recorded on the disc in alphabets as "KAWANONAGARENOYOUNI" using ASCII codes. For example, if this is displayed during the reproduction of the piece of music, the display in alphabets will be very difficult to read and will not sufficiently serve the function of displaying the title of the music. For example, if the display can be provided in katakana characters as "カワノ、ナガレ、ノヨウニ", it will be easier to read. It is therefore desired that the problem associated with the display of katakana characters is solved to allow the output of such display in katakana characters.

SUMMARY OF THE INVENTION

It is therefore an object of the present invention to provide an apparatus for recording on and/or reproducing from recording media which solves the above-described problem.

It is another object of the present invention to provide a method for recording on and/or reproducing from recording media which solves the above-described problem.

According to the present invention, there is provided an apparatus for recording on and/or reproducing from a recording medium having a code area in which character code data for outputting character information associated with information recorded in a recording area can be recorded, including an input portion, conversion portion, and recording and/or reproducing portion. The input portion inputs character information. The conversion portion converts each character in the character information input by the input portion into character code data and adds an identifier to the character code data during the conversion. The identifier indicates that the type of the characters in a character string in the character information input by the input portion is different from the type of those in the precedent character string. The character code data from the conversion portion is supplied to the recording and/or reproducing portion which performs recording and/or reproduction of information and the character code data on the recording medium.

According to the present invention, there is provided an apparatus for recording on and/or reproducing from a recording medium having a code area in which character code data for displaying character information associated with information recorded in a recording area can be recorded, including an input portion, conversion portion, and recording and/or reproducing portion. The input portion inputs plural pieces of character information of different kinds. The conversion portion converts each character in the character information input by the input portion into character code data and adds an identifier to the character code data during the conversion. The identifier indicates that the type of the characters in a character string in the character information input by the input portion is katakana characters unlike those in the precedent character string. The character code data from the conversion portion is supplied to the recording and/or reproducing portion which performs recording and/or reproduction of information and the character code data on the recording medium.

According to the present invention, there is provided a method for recording on and/or reproducing from a recording medium having a code area in which character code data for outputting character information associated with information recorded in a recording area can be recorded. According to this method of recording and/or reproduction, character information is input from an input portion; each character in the input character information is converted into character code data; an identifier is added to the character code data during the conversion to indicate that the type of the characters in a character string in the input character information is different from the type of those in the precedent character string; and the character code data added with the identifier is recorded on the recording medium.

BRIEF DESCRIPTION OF THE DRAWINGS

FIG. 1 illustrates ASCII codes.

FIG. 5 illustrates a P-TOC sector 0.

FIG. 6 illustrates a U-TOC sector 0.

FIG. 8 illustrates a P-TOC sector 1.

FIG. 9 illustrates an alphabet/katakana conversion method.

FIG. 10 illustrates processes in a character information recording operation of the embodiment of the invention.

FIG. 11 illustrates processes in a character information recording operation of the embodiment of the invention.

FIG. 13 illustrates processes in a character information reproducing operation of the embodiment of the invention.

DETAILED DESCRIPTION OF THE PREFERRED EMBODIMENT

An apparatus for recording on and/or reproducing from a recording medium according to an embodiment of the present invention will now be described with reference to the accompanying drawings. The present embodiment will be described below with reference to an apparatus for recording on and/or reproducing from a recording medium wherein a magneto-optical disc is used as the recording medium and speech and music information is recorded on this magneto-optical disc.

With this recording and/or reproducing apparatus, characters such as the titles of pieces of music can be recorded on the magneto-optical disc and the character information such as the titles recorded on the magneto-optical disc (hereinafter simply referred to as "disc") can be read and output for display. The description of the present invention is divided into the following parts which will be described in the order listed.

1. the configuration of the recording and/or reproducing apparatus
2. the structures of TOC's of a disc
3. character information recording operation
4. character information output operation

1. The Configuration of the Recording and/or Reproducing Apparatus

Figure 2:
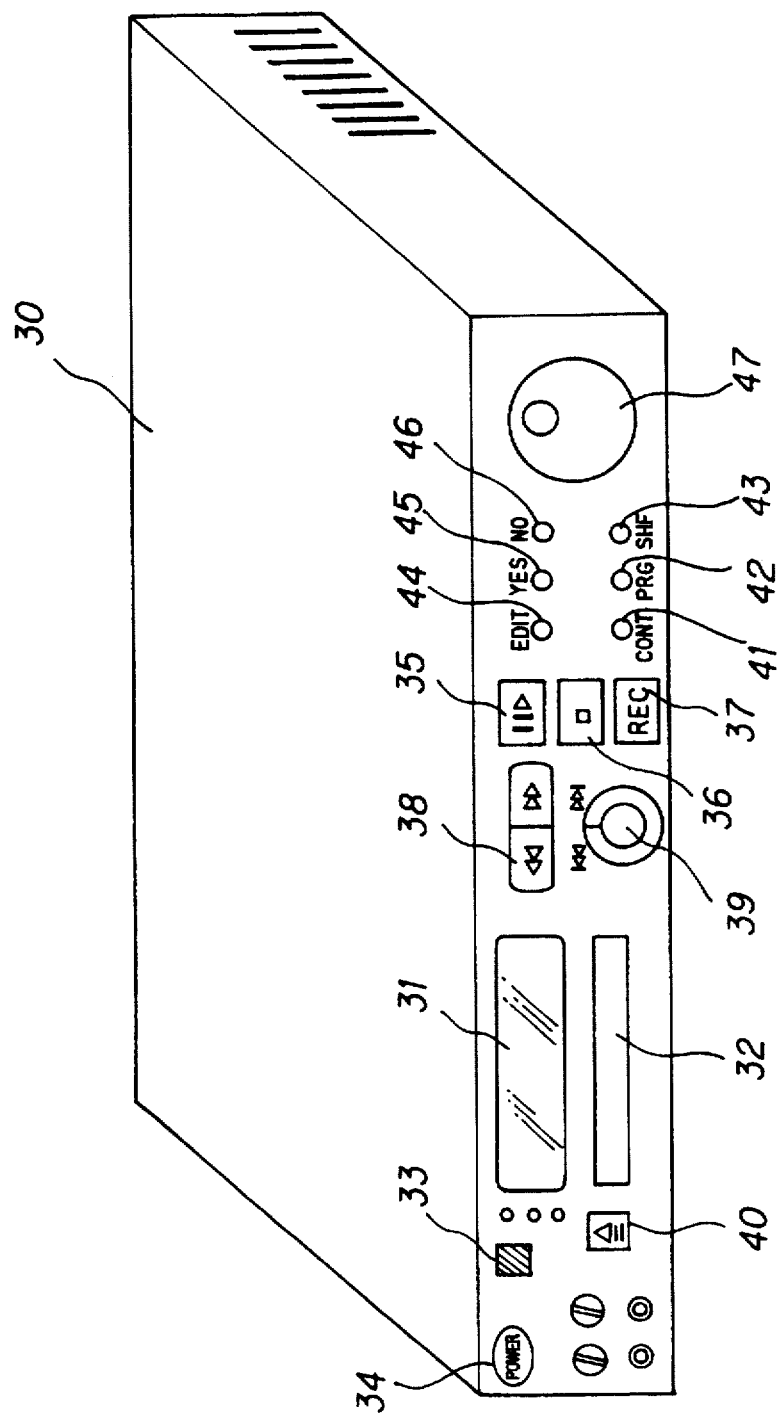
FIG. 2 illustrates the appearance of a recording and/or reproducing apparatus according to an embodiment of the invention.

FIG. 2 illustrates an example of the appearance of the recording and/or reproducing apparatus. A display portion 31 constituted by a liquid crystal display device or the like is provided on a front panel of the recording and/or reproducing apparatus 30. The display portion 31 displays the operation mode, the track No., the recording or reproduction time, the status of an editing operation, and the like for a recording or reproducing operation being performed on a disc. As described later, character information can be recorded on a disc, and the display portion 31 displays characters input during the input of such character information and character information read from a disc.

A disc is inserted into and ejected from the recording and/or reproducing apparatus through a disc insertion portion 32. On the front panel of the apparatus 30, there is provided a light receiving portion 33 for receiving infrared signals transmitted by a remote commander to be described later.

Various operation means 34 through 47 are provided on the front panel of the apparatus 30. A power supply key 34 is provided for turning on/off the power supply of the apparatus 30 as a whole. A reproduction key 35 serves also as a pause key. 36 designates a stop key. 37 designates a record key, 38 designates a Fast Forward (FF)/Rewind (REW) key. An AMS (automatic music scan) dial 39 is turned right to cause a skip to the a track having a track No. smaller than that of the current track and is turned left to cause a skip to a track having a smaller track No.

An eject key 40 is operated to eject a disc. When the eject key 40 is operated, the disc is ejected from the apparatus 30 through the insertion portion 32.

A reproduction mode key 41, a programmed reproduction mode key 42, and a shuffle reproduction mode key 43 are keys which normally operated to select and set a mode for the reproduction of information recorded on a disc.

An edit key 44 is a key operated to call and terminate various editing modes. An YES key 45 and a No key 46 are used for editing operations and the like.

In the apparatus 30, the input of characters is set as one of the editing modes, and a disc name input mode or track name input mode is called up using the edit key 44. The input of characters is performed after the editing mode is switched to the track name input mode.

A jog dial 47 is used for the input of characters. When the jog dial 47 is rotated, the ASCII code characters as shown in FIG. 2 such as alphabets, numerals, and symbols are sequentially displayed on the display portion 31. Further, katakana characters are also sequentially displayed on the display portion 31 in the present embodiment. For example, if the YES key 45 is pushed with a certain character displayed, the character is decided as a character to be input.

Characters are input in such a manner, and the input character string is settled by an operation such as a push on the edit key 44 or another push on the YES key 45 performed at a certain point in time and is written in a disc. The procedures for the input operation are not limited to this, and various other procedures are possible depending on the types of the keys provided.

Figure 3:
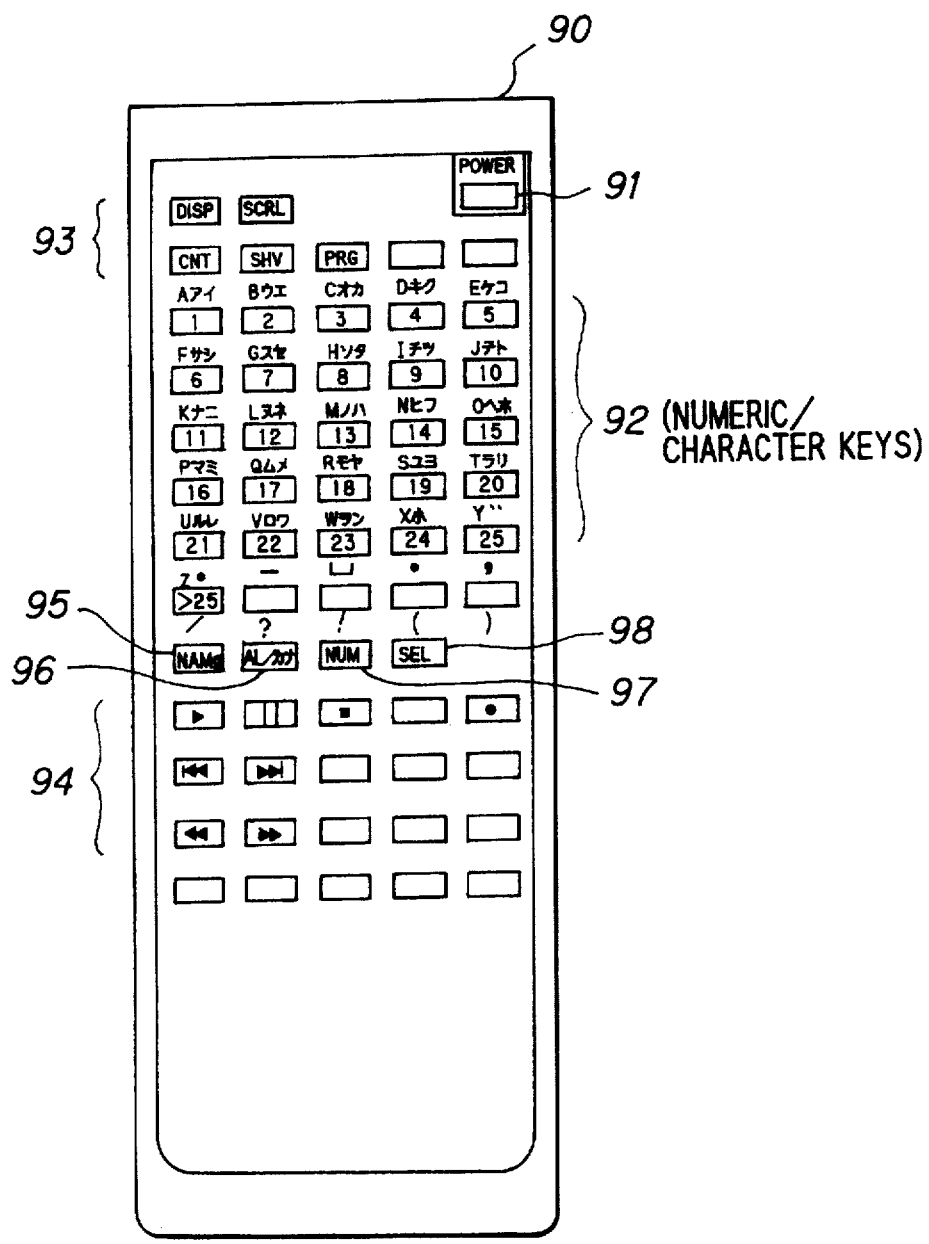
FIG. 3 illustrates a remote commander for the recording and/or reproducing apparatus according to the embodiment of the invention.

A remote commander 90 as shown in FIG. 3 is provided which is associated with the recording and/or reproducing apparatus 30.

The remote commander 90 reads a command codes from a ROM or RAM provided therein depending on a key which has been pushed, modulates the read command code, and output is as an infrared signal. This infrared signal is received by the light receiving portion 33 and is converted into an electrical signal serving as a command code pulse which is taken in by the recording and/or reproducing apparatus 30. The recording and/or reproducing apparatus 30 performs a recording or reproducing operation in accordance with the command code transmitted by the commander 90.

The remote commander 90 includes a power supply key 91 for turning the power supply of the apparatus 30 on and off.

The remote commander 90 further includes numeral/character keys 92 associated with numerals and characters, mode keys 93 for specifying display modes and reproduction modes, operation keys 94 such as reproduction, pause, stop, recording, FF/REW, and AMS (automatic music scan) keys, a character input mode key 95, a mode selection key 96 for selecting any one of input modes, i.e., a capital letter mode, a small letter mode, and a katakana mode, a numeral mode key 97 for selecting a numeral input mode, and a selection key 98.

Each of the numeral/character keys 92 is associated with a predetermined numeral, alphabet, katakana, symbol, etc.

The numeral/character keys 92 function as numeral keys. For example, the "3" key serves as a key to access (AMS key) a track which is assigned a track No. 3 if it is pushed during reproduction.

When the character input mode key has been pushed, the numeral/character keys 92 function as keys for inputting characters. Characters input are set in accordance with an operation on the mode selection key 96 or numeral mode key 97.

For example, the "1" key is associated with a numeral "1", an alphabet "A", and katakana characters "ア" and "ィ". When the capital letter input mode is enabled, a push on the "1" key causes the input of a character "A". When the small letter input mode is enabled, a push on the "1" key causes the input of a character "a". In the katakana input mode, a push on the "1" key causes the display portion 31 to display a character "ア"; a second push on the "1" key causes a character "ィ" to be displayed; and "ア" appears again upon a third push. That is, a toggle operation is performed. A user can input "ィ" by pushing the selection key 98 with "ィ" displayed as a result of a push on the "1" key.

When the character input mode key 95 is pushed at a certain point in time after some characters are input through such operations, the character string which has been input at that time is settled to be recorded on a disc.

Figure 4:
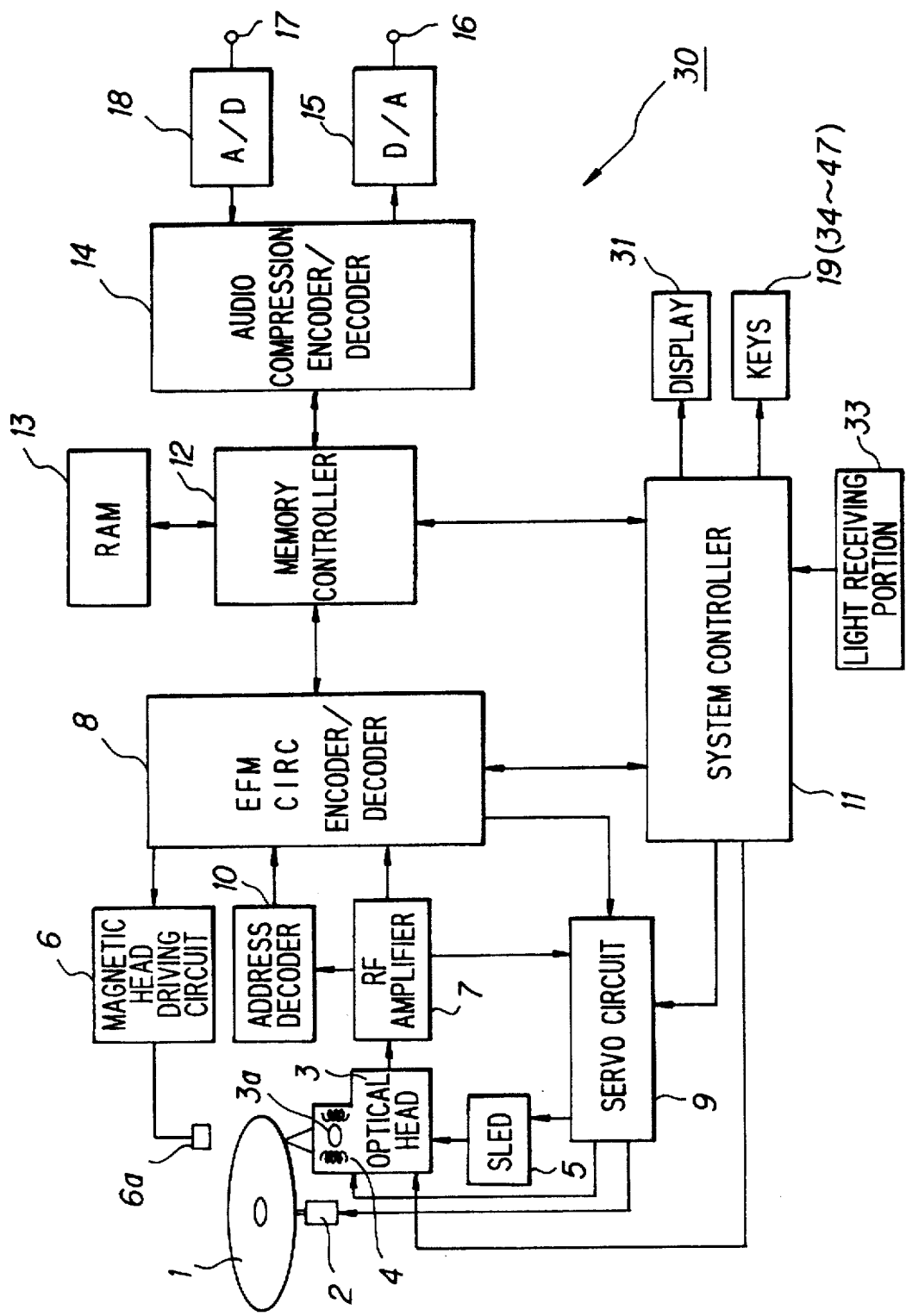
FIG. 4 is a block diagram of the recording and/or reproducing apparatus according to the embodiment of the invention.

FIG. 4 is a block diagram of a major part of the recording and/or reproducing apparatus 30.

In FIG. 4, a magneto-optical disc 1 on which audio data is recorded is driven for rotation by a spindle motor 2. An optical head 3 directs laser beams to the magneto-optical disc 1 during recording and reproduction. It outputs laser beams at a high level for heating a recording layer of the disc to a Curie point during recording and outputs laser beams at a relatively low level during reproduction to allow the detection of data from reflected light through a magnetic Kerr effect.

The optical head 3 has a laser diode as a light source, an optical system constituted by a polarizing beam splitter, an objective lens 3a, and the like, and a detector for detecting reflected light. The objective lens 3a is held by an actuator 4 so that it can be displaced in the radial direction of a disc and direction in which it moves toward and away from a disc, i.e., a focusing direction.

A magnetic head 6a applies a vertical magnetic field which has been modulated by the supplied data to the magneto-optical disc 1. The magnetic head 6a is disposed in a position such that it faces the optical head 3 with a magneto-optical disc 1 sandwiched therebetween. The optical head 3 as a whole and the magnetic head 6a are moved in the radial direction of a disc by a feed mechanism 5.

During reproduction, output signals from the detector of the optical head 3 which has detected the light reflected by a magneto-optical disc 1 are supplied to an RF amplifier 7. The RF amplifier 7 performs arithmetic processes on the output signals of the optical head 3 to generate an RF signal, a tracking error signal, a focus error signal, groove information (absolute position information recorded on the magneto-optical disc 1 as a pregroove (wobbling pregroove), etc. The generated RF signal is supplied to an encoder/decoder portion 8. The tracking signal and focus error signal are supplied to a servo circuit 9. The groove information is supplied to an address decoder 10 to be decoded and output as an absolute address.

The servo circuit 9 generates various servo drive signals in accordance with the tracking error signal and focus error signal thus supplied, a track jump command and an access command from a system controller 11, information on the detected rotational speed of the spindle motor 2, etc. The various servo drive signals generated are supplied to the actuator 4 and feed mechanism 5 to control focusing and tracking. Further, the spindle motor 2 is controlled so that it rotates the magneto-optical disc 1 at a constant linear velocity (CLV).

The RF signal is subjected to decoding processes including EFM demodulation and CIRC at the encoder/decoder portion 8 and is thereafter written in a buffer memory 13 temporarily by a memory controller 12. The reading of data from the magneto-optical disc 1 by the optical head 3 and the transfer of reproduction data in the system from the optical head 3 up to the buffer memory 13 are intermittently carried out at 1.41 Mbit/sec. The buffer memory 13 is constituted by a RAM having a memory capacity of 1 Mbit, 4 Mbit, etc.

The data written in the buffer memory 13 is read at timing such that the transfer of reproduction data is performed at 0.3 Mbit/sec. and is supplied to the encoder/decoder portion 14. The data is subjected to reproduction signal processing including a process to decode audio compression at the encoder/decoder portion 14 and is converted by a D-A converter 15 into an analog signal which is in turn supplied to an external amplification circuit or the like from an output terminal 16. For example, the analog signal output from the output terminal 16 is output as L and R analog audio signals.

Data is written in and read from the buffer memory 13 in addresses specified by the memory controller 12 through control over a write pointer and read pointer. The write pointer (write address) is incremented at timing of 1.41 Mbit/sec. while the read pointer (read address) is incremented at timing of 0.3 Mbit/sec. The difference between the writing and reading bit rates accumulates data in the buffer memory 13. When data has been accumulated in the buffer memory 13 to fill the memory capacity of the memory, the write pointer is not incremented any more and the reading of data from the magneto-optical disc 1 by the optical head 3 is also stopped. However, since the read pointer is further incremented, the analog signal output from the output terminal 16 is not interrupted.

Thereafter, when the amount of the data accumulated in the buffer memory 13 falls below a predetermined amount at a certain point in time as a result of the continued readout from the buffer memory, the reading of data by the optical head 3 and the incrementation of the read pointer are resumed to accumulate data in the buffer memory 13 again.

By outputting the reproduction signal through the buffer memory 13 as described above, it is possible to prevent the interruption of the output of the reproduction signal even when tracking servo does not properly work due to disturbances or the like. For example, the reading of data can be resumed by accessing the correct tracking position, i.e., the position where scanning had been performed before tracking servo failed, while the buffer memory 13 still has data. Thus the operation can be continued without any influence on the reproduction output. This improves anti-vibration characteristics significantly.

Address information output by the address decoder 10 and subcode data used for control operations are supplied through the encoder/decoder portion 8 to the system controller 11 to be used for various control operations.

The system controller 11 is constituted by a microcomputer. As described later, the system controller 11 converts character information input using the commander 90 or jog dial 47 into character code information and automatically generates an identification character when the katakana input mode is set as a result of a character input mode switching operation on the selection key 96 of the remote commander 90. The system controller 11 decodes character code data read from a disc 1 and supplies it to the display portion 31 as display data.

Further, the system controller 11 outputs a laser control signal for controlling the operation of the laser diode of the optical head 3. The system controller 11 controls the turning on/off of the output of the laser diode and can switch the power of the laser which is on between a relatively low level to be output during reproduction and a relatively high level to be output during recording.

When a recording operation is performed on a magneto-optical disc 1, an analog audio signal as a signal to be recorded supplied to the input terminal 17 is converted by an A-D converter 18 into a digital signal which is in turn supplied to the encoder/decoder portion 14 which performs an audio compression encoding process.

The data compressed by the encoder/decoder portion 14 is temporarily written in the buffer memory 13 by the memory controller 12 and is then read from the buffer memory 13 at predetermined timing to be sent to the encoder/decoder portion 8. The data is subjected to encoding processes such as CIRC encoding and EFM modulation at the encoder/decoder portion 8 and is thereafter supplied to a magnetic head driving circuit 6.

The magnetic head driving circuit 6 supplies a magnetic head driving signal to the magnetic head 6a in accordance with the encoded data to be recorded. Specifically, an n-pole or s-pole vertical magnetic field in applied to the magneto-optical disc 1 by the magnetic head 6a. The system controller 11 supplies a control signal to the optical head 3 to cause it to output laser beams at a recording level.

The reference numeral 19 designates an operation input portion on which keys and the like to be operated by the user are provided including the above-described operation keys and dials indicated by the reference numerals 34 through 47. The input from the operation input portion 19 is supplied to the system controller 11. The display portion 31 is supplied with display data from the system controller 11, and the system controller 11 receives the output signal of the light receiving portion 33.

When a recording and/or reproducing operation is performed on a disc 1, management information recorded on the disc 1, i.e., a P-TOC (pre-recorded table of contents) and a U-TOC (user TOC), must be read out. Based on such management information, the system controller 11 determines the address of the area of the disc 1 in which recording is to be performed and/or the area in which reproduction is to be performed. The management information is maintained in the buffer memory 13. For this purpose, the buffer memory 13 is divided into an area for buffering the data to be recorded and reproduced as described above and an area for maintaining the management information.

The system controller 11 reads the management information when a disc 1 is loaded by causing an operation to reproduce the side of the inner circumference of the disc where the management information is recorded, causes the buffer memory 13 to store it, and refers to it during recording and/or reproducing operations performed thereafter. The system controller 11 may fetch a part of the TOC data read into the buffer memory 13 into a RAM in itself.

The U-TOC data is to be edited and rewritten when data is recorded or erased. The system controller 11 performs such an editing process each time data is recorded or erased on the U-TOC data stored in the buffer memory 13 and also rewrites the U-TOC area of the disc 1 at predetermined timing in accordance with the rewriting operation. For example, when the disc 1 is ejected or the power supply is turned off, such operations are carried out after the U-TOC data in the U-TOC area of the disc 1 is rewritten.

A description will now be made on audio data sectors for recording on a disc 1 on a sector data basis and P-TOC and U-TOC sectors for managing recording and/or reproducing operations on audio data.

2. The Structures of TOC'S on a Disc (1) P-TOC Sector

First, a description will be made on P-TOC sectors as management information for managing recording and/or reproducing operations on the tracks of a disc 1.

P-TOC data serves functions including the specification of areas such as a recordable area of a disc (recordable user area) and the management of a U-TOC area. When the disc 1 is a pre-recorded disc which is an optical disc to be exclusively used for reproduction, the P-TOC data allows also the management of the pieces of music recorded thereon on a ROM basis.

FIG. 5 shows one sector (sector 0) of P-TOC data which is repeatedly recorded in an area allocated for a P-TOC (e.g., a pre-recorded area at the side of the inner circumference of a disc). Although there are P-TOC sectors 0 through 4, the sectors 1 through 4 are optional.

A data area (4 bytes×588=2352 bytes) of the P-TOC sector 0 is added with four bytes at the beginning thereof including synchronization patterns each having data of one byte whose bits are all one or all zero and addresses indicating cluster and sector addresses. They constitute a header.

At a predetermined address that follows the header, there is provided an identification ID using ASCII codes that correspond to characters "MINT" to indicate it is an area of the P-TOC.

Thereafter, there is recorded the disc type, the recording level, the title No. of the first piece of music recorded therein (First TNO), the title No. of the last piece of music (Last TNO), a readout start address $LO_A$, the state of the use of sectors (Used Sectors), the start address of a power calibration area $PC_A$, the start address of a U-TOC $UST_A$, the start address of a recordable area (recordable user area) $RST_A$, etc.

Next, an associated table specifying data portion is provided which includes table pointers (P-TNO1 through PTN0255) for associating pieces of music and the like recorded in the form of bits as physical irregularities with part tables in a management table portion to be described later.

In the area that follows the associated table specifying data portion, there is provided a management table portion including 255 part tables (01h) through (FFh) which are associated with the table pointers P-TNO1 through P-TNO255. In this specification, a numeral value accompanied by "h" is hexadecimal.

The start and end addresses of a part and information on the mode of the part (track mode) can be recorded in each part table.

As the track mode information in each part table, information is recorded on whether or not overwriting and data copying is inhibited for the part, whether the part has audio information or not, and whether the information is monophonic or stereophonic.

The contents of the part tables (01h) through (FFh) in the management table portion are indicated by the respective table pointers P-TNO1 through P-TNO255. Specifically, for the first piece of music, a certain part table, e.g., (01h), is recorded as the table pointer P-TNO1. In this case, the start address of the part table (01h) is the start address of the position wherein the first piece of music is recorded. Similarly, the end address of the part table (01h) is the end address of the position wherein the first piece of music is recorded. The track mode information is the information on the first piece of music.

In practice, a table pointer shows a numerical value which can be subjected to a predetermined arithmetic process to indicate a certain part table as the position of a byte in the P-TOC sector 0.

Similarly, for the second piece of music, the start and end addresses of the position wherein the second piece of music is recorded and the track mode information thereof are recorded in the part table indicated by the table pointer P-TNO2, e.g., (02h).

Since similar table pointers are provided up to the table pointer P-TNO255, up to 255 pieces of music can be managed on the P-TOC.

Such a configuration of the P-TOC sector 0 makes it possible, for example, to access and reproduce predetermined pieces of music during reproduction.

In the case of a recordable and reproducible magneto-optical disc wherein the so-called pre-recorded music area is not provided, the associated table specifying data portion and management table as described above are not used (they are managed by a U-TOC to be described later). Therefore, all bytes are "00h".

In the case of a pre-recorded type disc on which all pieces of music are recorded in the form of bits as physical irregularities or a hybrid type disc having both a ROM area and an optical area wherein music and the like can be recorded as areas for recording music and the like, the above-described associated table specifying data portion and management table portion are used for the management of the pieces of music in the ROM area.

(2) U-TOC Sector

A description will now be made on the U-TOC with reference to sectors 0 and 1 of the U-TOC. Sectors 2 and 4 will be briefly described later.

Sector 3 and sectors 5 through 7 are undefined.

<U-TOC Sector 0>

FIG. 6 shows a format of the U-TOC sector 0 which is a data area wherein management information is recorded for free areas where a user can record pieces of music and where new pieces of music can be recorded.

For example, when a piece of music is to be recorded on a disc 1, the system controller 11 finds a free area on the disc from the U-TOC sector 0 and records audio data in the free area thus found. Reproduction is performed by determining the area in which the piece of music to be reproduced is recorded from the U-TOC sector 0 and by accessing the area.

In the U-TOC sector 0 shown in FIG. 6, like the P-TOC, data is recorded, including a header, a manufacturer code in a predetermined address following the header, a model code, the title No. of the first piece of music (First TNO), the title No. of the last piece of music (Last TNO), the status of the use of the sectors), the serial No. of the disc, and the ID of the disc.

In order to identify the areas for pieces of music recorded by a user and free areas by associating them with a management table portion to be described later, an area is provided for recording various table pointers P-DFA, P-EMPTY, P-FRA, and P-TNO1 through P-TNO255 as an associated table specifying data portion.

255 part tables 01h through FFh are provided as a management table portion which is associated with the table pointers from P-DFA up to P-TNO255. Like the P-TOC sector 0 shown in FIG. 5, the start and end addresses of a certain part and the mode information (track mode) of the part are recorded in each of the part tables. The term "part" used here means an area of the recording area of a disc 1 wherein data is recorded. As described later, one item of data such as a sound may be recorded in one part and may alternatively be divided into a plurality of parts.

Since a part indicated by each part table in this U-TOC sector 0 may be linked to another part, link information can be recorded to indicate the part table in which the start and end addresses of the part to be linked.

With this type of recording and/or reproducing apparatus, the data of one piece of music can be reproduced without any problem even if it is physically discontinuously recorded, i.e., it is recorded in a plurality of parts because reproduction is performed by accessing the data between the parts. Therefore, a piece of music or the like recorded by a user may be recorded in plurality of parts for purposes such as effective utilization of the recordable area.

For this purpose, the link information is provided and, for example, parts can be linked by specifying the parts tables to be linked using the numbers 01h through FFh assigned to the parts tables.

In practice, the link information is represented by a numerical value which is subjected to a predetermined arithmetic process to indicate the position of a byte in the U-TOC sector 0. Specifically, a part table is specified by 304+(link information)×8.

In the case of a pre-recorded disc, a piece of music or the like recorded in the form of bits as physical irregularities is not normally divided into parts. Therefore, as shown in FIG. 5, the link information in the P-TOC sector 0 is all set to "(00h)".

Thus, one part table in the management table of the U-TOC sector 0 represents one part. For example, in the case of a piece of music constituted by three parts linked to each other, the positions of the parts are managed using three parts tables linked by link information.

The contents of the parts tables 01h through FFh in the management table portion of the U-TOC sector 0 are indicated by the table pointers P-DFA, P-EMPTY, P-FRA, and P-TNO1 through P-TNO255 in the associated table specifying data portion as described below.

The table pointer P-DFA indicates a defective area on the disc 1 by pointing one part table or the first one of a plurality of part tables showing the portion of the track (part) which is the defective area produced by a scratch or the like. In other words, if there is a defective part, one of (01h) through (FFh) is recorded in the table pointer P-DFA, and the corresponding part table indicates the defective part using the start and end addresses thereof. If there is another defective part, the link information in the part table specifies another part table which indicates the second defective part. If there is no further defective part, the link information is "(00h)" which indicates that there is no further defective part linked thereto.

The table pointer P-EMPTY indicates one unused part table or the first one of a plurality of unused part tables in the management table portion. If there is an unused part table, one of (01h) through (FFh) is recorded as the table pointer P-EMPTY. If there are a plurality of unused part tables, such part tables are sequentially specified by the link information starting with the part table specified by the table pointer P-EMPTY. Thus, all of the unused part tables are linked on the management table portion.

The table pointer P-FRA indicates free areas in which data can be written (including erased areas) on a disc 1. It specifies one part table or the first one of a plurality of part tables showing the portion of the track which is a free area. In other words, if there is a free area, one of (01h) through (FFh) is recorded as the table pointer P-EMPTY, and the corresponding part table indicates the part which is a free area using the start and end addresses thereof. If there are a plurality of such part, i.e., if there are a plurality of such part tables, they are sequentially specified by the link information up to the part table whose link information is "(00h)".

Figure 7:
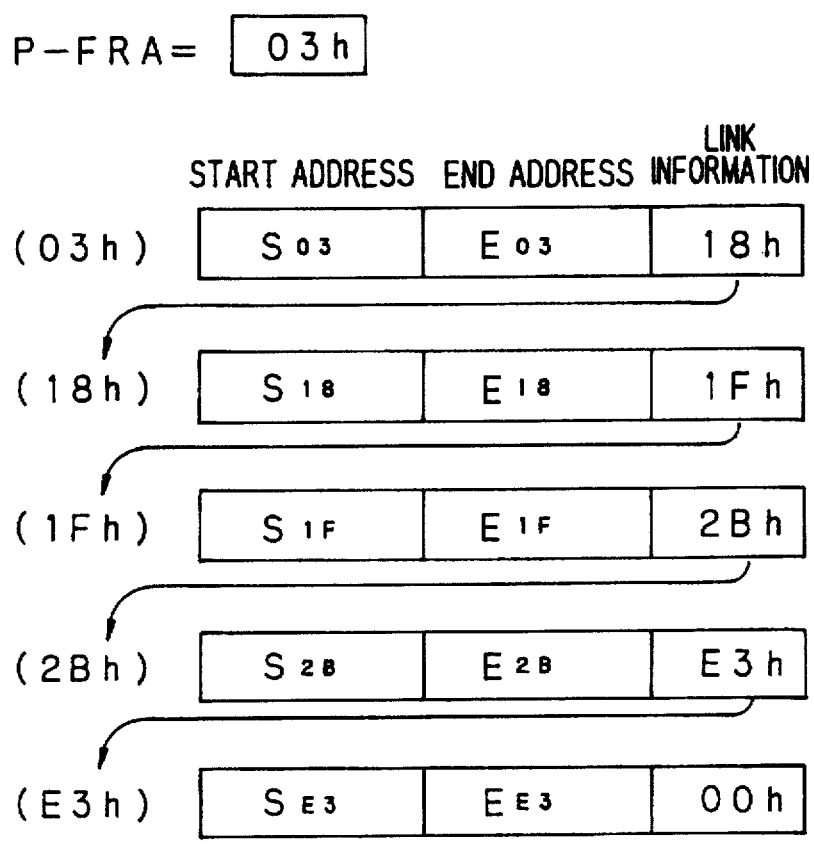
FIG. 7 illustrates a mode of linkage in the U-TOC sector 0.

FIG. 7 schematically shows the state of the management of parts which are free areas using part tables. FIG. 7 shows that when parts (03h), (18h), (1Fh), (2Bh), and (E3h) are free areas, such a state is represented by the associated table specifying data P-FRA followed by the linkage between the part tables (03h), (18h), (1Fh), (2Bh), and (E3h). The management of defective areas and unused part tables as described above is performed by the same way.

In the case of a magneto-optical disc on which no audio data such as music is recorded and which has no defect, the table pointer P-FRA specifies the part table (01h), thereby indicating that the entire recordable user area of the disc is a free area. In this case, since the remaining part tables (02h) through (FFh) are not used, the above-described table pointer P-EMPTY specifies the part table (02h); the part table (03h) is specified by the link information on the part table (02h); and such linkage is continued up to the part table (FFh). The link information of the part table (FFh) is "(00h)" which indicates that there is no further link.

In this case, the start address of the recordable user area is recorded as the start address of the part table (01h), and the address preceding the readout start address is recorded as the end address of the same part table.

The table pointers P-TNO1 through P-TNO255 indicate pieces of music recorded on a magneto-optical disc 1 by a user. For example, the table pointer P-TNO1 specifies the part table that shows the single part wherein the first piece of music is recorded or one of the plurality of parts wherein the first piece of music is recorded which temporally comes first.

Assume that the first piece of music is not recorded on separate tracks on the disc, i.e., it is recorded in a single part.

Then, the recording area of the first piece of music is recorded as the start and end addresses in the part table indicated by the table pointer P-TNO1.

If the second piece of music is discretely recorded in a plurality of parts on the disc, the relevant parts are specified in the temporal order in which they come to indicate the positions where the piece of music is recorded. Specifically, the part tables are sequentially specified into the temporal order by the link information starting with the part table specified by the table pointer P-TNO2 like the case shown in FIG. 7, and are linked up to the part table having link information "(00h)". Thus, for example, all the parts having the data constituting the second piece of music is sequentially specified and recorded. As a result, when the second piece of music is reproduced or overwrite is attempted in the area of the second piece of music using the data in the U-TOC sector 0, it is possible to take out continuous music information from the discrete parts by causing the optical head 3 and magnetic head 6a to access them and to perform recording wherein the recordable area is effectively used.

<U-TOC Sector 1>

FIG. 8 shows a format of the U-TOC sector 1 which is a data area for recording character information input by a user to note the title of the pieces of music the or she has recorded and to entitle the disc.

Slot pointers P-TNA1 through P-TNA255 are provided in the U-TOC sector 1 as a data portion for specifying character slots associated with the recorded pieces of music. Further, there is provided a character slot portion which is specified by the slot pointers P-TNA1 through P-TNA255. The character slot portion has 255 units of slots (01h) through (FFh) formed therein, one unit containing eight bytes. The character sot portion manages character data in substantially the same manner as in the case of the above-described U-TOC sector 0.

In the slots (01h) through (FFh), character information as the title of the disc (disc name) and the titles of pieces of music (track names) are recorded using the ASCII codes as shown in FIG. 1. The slot consisting of eight bytes preceding the slot (01h) is an area to be exclusively used for the disc name.

For example, in the slot specified by the slot pointer P-TNA1, a characters input by the user for the first piece of music is recorded.

Since the slots are linked to each other by link information, characters for one piece of music (track) can be input even if the number of the characters exceeds seven bytes (seven characters).

The slot pointer P-EMPTY in this U-TOC sector 1 is used for managing unused slots. Specifically, unused slots are managed in the same manner as for the management of unused part tables using the table pointer P-EMPTY in the U-TOC sector 0 as described above.

In addition to the above-described U-TOC sectors 0 and 1, a data area is provided as a U-TOC sector 2 which is mainly used for recording the data and time at which the user has recorded pieces of music.

A data area is provided as a U-TOC sector 4 which is used for recording character information input by the user to note the titles of the pieces of music he or she recorded and to entitle the disc, like the sector 1.

However, this sector is used for recording code data associated with kanji characters and European characters. In addition to the data in sector 1 as shown in FIG. 13, the attributes of character codes are recorded in predetermined bytes.

As in the sector 1, the management of the character information in this U-TOC sector 4 is carried out using slot pointers P-TNA1 through P-TNA255 as a data portion for specifying character slots and 255 units of slots (01h) through (FFh) specified by the slot pointers P-TNA1 through P-TNA255.

3. Character Information Recording Operation

As described above, character information can be recorded in the area of the U-TOC sector 1 of a disc 1 using ASCII codes. In the present embodiment, katakana information can be recorded in the U-TOC sector 1 in addition to the ASCII codes as shown in FIG. 1. However, it should be noted that what is actually recorded is only the ASCII codes and the recording of any katakana which has been input is carried out by converting it into an ASCII code. A description will be made below on a character information recording operation wherein katakana characters can be recorded using only ASCII codes.

In this embodiment, recording is performed in accordance with the following rules depending on the characters input.

First, if katakana input is performed, each of the input katakana characters is converted into an alphabet as shown in FIG. 9. For example, "ア" is converted into "A", and "ｱ" is converted into "a". Similarly, "カ" is converted into "KA", and "ワ" is converted into "WA".

Such conversion is based on a complete one-to-one relationship between the two types of characters. In other words, one katakana character is converted into only one alphabetic representation.

For example, an input "シャ" consists of katakana characters "シ" and "ャ" which are converted into "SI" and "ya", respectively. "シ" is not converted into "SHI", and " " and "ャ" are not collectively converted into "SYA" or "SHA".

When a katakana input is converted based on the correspondence shown in FIG. 9, identification characters are added before and after the character string. In this embodiment, such an identification character is "^". "^" is one of the recordable ASCII codes as shown in FIG. 1. For example, when the user inputs characters "ギリシャ" in the katakana input mode, they will be converted into a character string "^GIRISIya^" as a result of conversion according to the rules shown in FIG. 9 and the addition of the identification character "^". The identification character "^" is automatically added when the selection key 96 on the commander 90 shown in FIG. 3 is operated to switch the character input mode from the alphabet input mode to katakana input mode. Specifically, when the selection key 96 is operated to enable the switching to the katakana input mode, the identification character "^" is automatically added following the character code data which has been input in the alphabet input mode. When the selection key 96 is operated again to enable the alphabet input mode after the input in the katakana character input mode is finished, the identification character "^" is automatically added following the character code data which has been input in the katakana input mode.

FIG. 10 shows examples (a) through (d) of recorded character strings which have been converted from input characters according to the above-described two rules.

In FIG. 10, an example is shown at (a) wherein there is no input of katakana characters. In this case, the character string "ABC5de" is recorded on the disc as it is.

In the cases shown at (b) and (c) in FIG. 10, there is a katakana input. Each character is converted into an alphabet and the identification character "^" is added before and after the converted characters.

In the cases shown at (d) and (e) in FIG. 10, the input characters include both katakana characters and alphabets. In these case, as shown in FIG. 10, the part of katakana characters is converted into alphabets and the identification character "^" is added before and after the converted characters.

There is another rule that a character string sandwiched by identification characters "^" should not have bytes in excess of a predetermined number of bytes, e.g., 80 bytes.

Assume that a character string "アイウエオカキクケコ... ラリルレロアイウエ" is input as shown at (F) in FIG. 10. Then, "アイウエ オカキクケコ... ラリルレロ" is converted into "^AIUEOKAKIKUKEKO ... RARIRURERO^" according to the rule shown in FIG. 9. In this case, the number of the bytes of the character string sandwiched by the identification characters "^" is 86 (one ASCII code is one byte). In such a case, the character string is divided into parts and the identification character "^" is added accordingly. In the Example 1 shown at (f) in FIG. 10, the character string is divided into "^AIUEOKAKIKUKEKO ... RA^" and "^RIRURERO ^" so that each character string sandwiched by identification characters "^" does not exceed 90 bytes. Such division may be made as shown in the Example 2. It goes without saying that various other ways of division are possible.

When katakana input characters are added to a character string which has already been recorded, the new input character string (converted character string) is independently sandwiched by identification characters "^". For example, assume that character strings "ABC", "^AIU^", and "ABCD" as shown at (a), (b), and (c) in FIG. 11 have already been recorded in the U-TOC area associated with a track of a disc. Then, when katakana inputs are added without deleting them, the character strings obtained by converting the input katakana characters are sandwiched by identification characters "^" as shown in FIG. 11. For example, as shown at (b) in FIG. 11, the newly input character string "カキク" is independently converted into "^KAKIKU^" instead of being combined into a character string "^AIUKAKIKU^". The purpose is to prevent the number of the bytes sandwiched by identification characters "^" from being increased by the addition of characters.

In addition to the processing rules as described above, the user is inhibited from inputting "^" which is chosen as the identification character as a character.

Specifically,"^" can not be displayed by operating the jog dial 47, and the remote commander 90 does not have a key associated with "^".

A description will now be made with reference to FIG. 12 on a process performed by the system controller 11 to write input characters in the U-TOC sector 1 of a disc in accordance with the above-described rules.

As described above, the recording and/or reproducing apparatus 30 enters a name input mode in response to an operation on an edit key 44 or a name input mode key 95 on the remote commander 90. If a particular track is specified when the name input mode is enabled, a track name input mode is enabled for inputting the title of a piece of music or the like associated with the track. If no track is specified, a disc name input mode for inputting the disc title or the like is enabled.

If the name input mode is enabled, the process proceeds from step F101 to step F102 and proceeds to step F116 if the input characters are not katakana characters.

If ASCII code characters are input at this stage, the characters are set as a character string to be recorded as they are (F119).

15

If the name input mode is terminated here, the process proceeds from step F117 to step F121. For example, as shown at (a) in FIG. 10, a character string "ABC5de" to be recorded is set in response to an input "ABC5de".

When katakana characters are input following the input of alphabets or numerals, the process returns from step F118 to step F102 and then proceeds to step F103.

When katakana input is performed, i.e., when the selection key 96 on the commander 90 is operated to cause switchover to the katakana input mode, it is determined at step F102 that the katakana character input mode has been enabled, and the process proceeds to step F103. At step F103, a "beginning of kana" flag is turned on. This is a flag which indicates the beginning of a katakana character string. Then, the byte count value BTN is set to 0 (F104).

If the user input katakana characters using the commander 90 or jog dial 47, the process proceeds from step F105 to step F108. When the input of the first katakana character has been performed, the "beginning of kana" flag is on. The process proceeds to step F109 to set an identification character "^" in the character string to be recorded. Then, the "beginning of kana" flag is turned off (F110).

Next, an input katakana character is converted into an alphabet according to the rule shown in FIG. 9 (F111). The alphabet thus converted is set in the character string to be recorded (F112). Further, the number of the bytes of the converted alphabet is added to the byte count value BTN. For example, if " ア " is input, the alphabet after conversion is "A", and the number of bytes to be added is 1. If " カ " is input, the alphabet after conversion is "KA", and the number of bytes to be added is 2.

Then, the process returns through step F114 to step F105 to wait for the input of the second character. Since the "beginning of kana" flag is off when the second katakana character is input, the process proceeds from step F108 to step F111 to perform conversion into an alphabet. The alphabet is set in the character string to be converted and the number of the bytes is counted as described above (F112 and F113).

If the name input mode is terminated at a certain point in time as a result of the operation on the selection key 96 on the commander 90 to switch the character input mode or the like, the process proceeds from step F106 to step F120 where an identification character "^" is set at the end of the character string.

Therefore, if characters " ギリシャ " are input as shown at (c) in FIG. 10, an identification character "^" is set at step F109; thereafter, each character is converted into an alphabet and is set by the processes at steps F111 and F112; and an identification character "^" is finally set at step F120. Now, the character string to be recorded in the U-TOC area of the disc 1 is "^GIRISIya^" as shown at (c) in FIG. 10.

If "ABCアイウエオ" is input as shown at (d) in FIG. 10, "ABC" is first set at step F119 and the process proceeds to step F103 and the subsequent steps as a result of switching to the katakana character input mode through the operation on the selection key 96 as described above. An identification character "^" is set (F109 and F120) and each of the katakana input characters is converted into an alphabet and is set (F112) to provide a character string "ABC^AIUEO^" to be recorded in the U-TOC area of the disc 1.

When the input mode is changed from the katakana character input mode to an ASCII code input mode, the process proceeds from step F107 to step F115 to set an identification character "^" at the end of the character string which has been set. Then, the process proceeds from step F102 to step F116 to start an ASCII code input process.

16

Therefore, for example, if " カキク " is input as shown at (e) in FIG. 10, the identification character "^" is set at steps F109 and F115; each katakana input character is set after being converted into an alphabet (F112); and the ASCII code input process is performed (F119). Thus, a character string "^KAKIKU^Xyz" to be recorded is provided.

If a large amount of katakana characters are input, the number of the bytes of the character string thus set may exceed 80. In order to avoid this, it is determined at step F114 whether or not the byte count value BTN has exceeded a certain value $BTT_H$. For example, the value $BTT_H$ may be 78 bytes or may be set to about 30 bytes. In order that the number of bytes of the set character string does not exceed 80 bytes, the value $BTT_H$ may be set to 78 bytes or less. With this value set to 79 bytes, if the next katakana input is a character which is converted into alphabets of two bytes, the character string will have 81 bytes. If the value $BTT_H$ is set to 79 bytes or less, such a situation can be avoided.

When the byte count value BTN exceeds the value $BTT_H$, the process proceeds to step F115 where an identification character "^" is set at the end of the character string which has been set. Then, the process proceeds from step F102 to step F103 where the process associated with kana input is continued. In a case as shown at (f) in FIG. 10, an arrangement is made so that a character string sandwiched by identification characters "^" does not exceed 80 bytes as shown in the Examples 1 and 2 at (f) in FIG. 10. A dividing point in such a case is determined by the value $BTT_H$ used at step F114. The above-described process applies to a case as shown in FIG. 11 wherein new input characters are added to a character string which has already been recorded. Specifically, the character string which has been recorded is set as a character string to be recorded and, if this character string character string is not deleted, the input characters and identification characters are set in addition thereto through the process as described above.

When the name input mode is terminated, the data in the U-TOC is updated at step F121. Specifically, the character string to be recorded which has been set by the input operation is written in a predetermined position of the U-TOC sector 1. Such an update operation is carried out on the U-TOC data which has been fetched into the buffer memory 13, and the U-TOC data on the disc 1 is updated when the disc is ejected or the power supply is turned off.

The above-described recording operation on input characters allows katakana information to be recorded using ASCII codes in accordance with the above-described rules.

Figure 12:
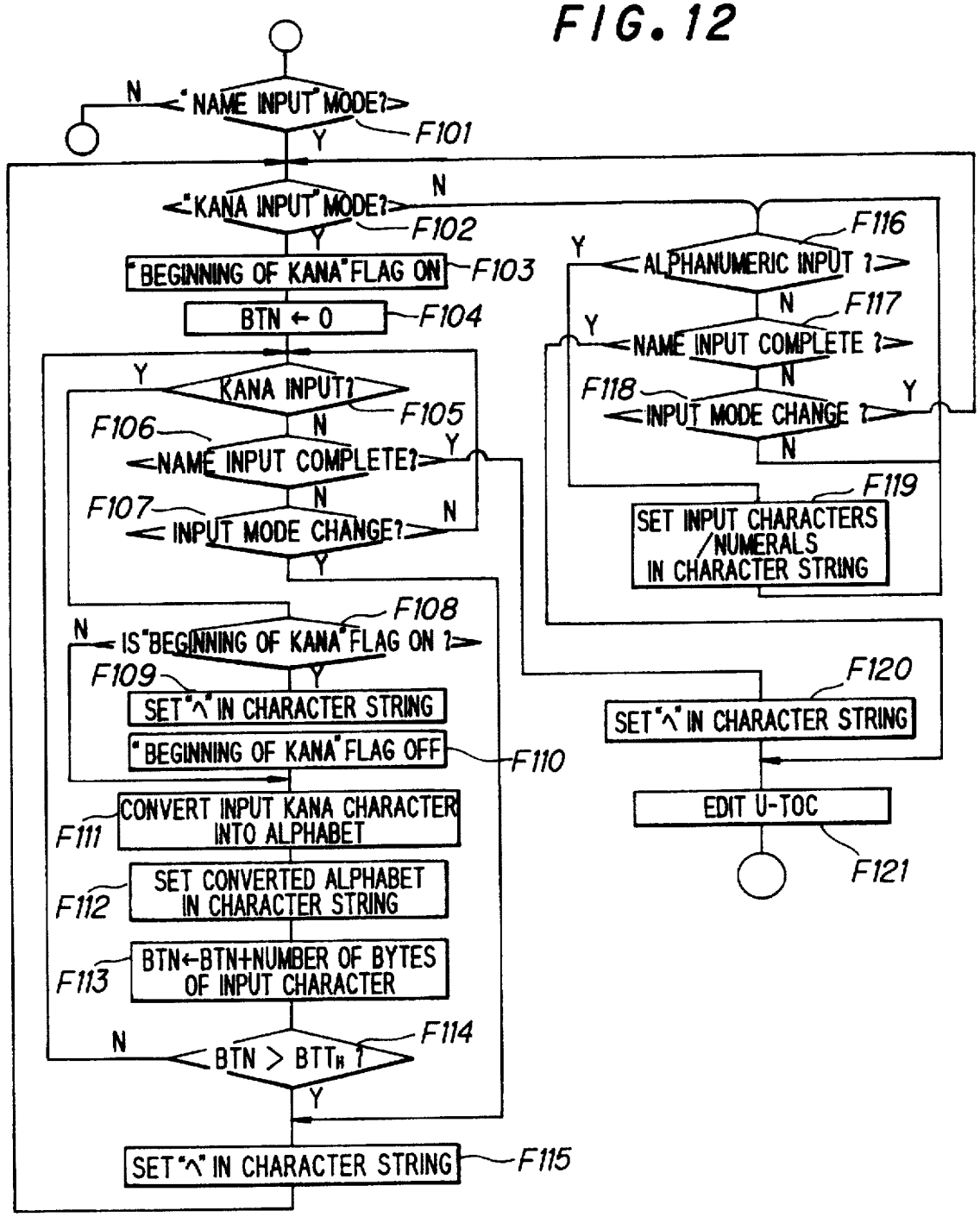
FIG. 12 is a flow chart for the processes in the character information recording operation of the embodiment of the invention.

Needless to say, the present invention is not limited to the exemplary process shown in FIG. 12 but may be practiced in various process steps.

4. Character Information Output Operation

A description will now be made on a process performed to display character information recorded in the area of the U-TOC sector 1 of a disc 1 using ASCII codes. According to this process, a character string which has been converted from a katakana input through the conversion into alphabets and the addition of the identification character "^" as described above can be converted into katakana characters and displayed.

In the present embodiment, the display of characters is performed in accordance with the following rules.

First, conversion between alphabets and katakana characters is performed on a one-to-one basis in accordance with the table shown in FIG. 9 as in recording.

Although the conversion into katakana characters is performed on an alphabet character string which is sandwiched by identification characters "^", the conversion will not be performed if the alphabet character string sandwiched by identification characters "^" exceeds 80 bytes.

For example, the character string "^AIUEO . . . RARIRURERO^" shown at (g) in FIG. 13 is used as display data as it is without converting it into katakana characters because the alphabet character string sandwiched by identification characters "^" exceeds 80 bytes.

Next, if the alphabet character string sandwiched by identification characters "^" is 80 bytes or less, the character string is converted into katakana characters. However, if any part of the character string can not be converted, the character string is not converted into katakana characters.

For example, the character string "^GIRISIya^" shown at (d) in FIG. 13 is 80 bytes or less and has no portion which can not be converted according to the rule shown in FIG. 9. Therefore, it is converted into "ギリシャ". The converted data is output to the display portion 31 as display data which will display the character information "ギリシャ". However, in the case of the character string "^GIRISYA^" shown at (e) in FIG. 13, the portion of "SYA" can not be converted. Therefore, in this case, no conversion takes place, and "^GIRISYA^" is output as it is as display data.

A description will now be made with reference to FIG. 14 on a process performed by the system controller 11 to display character information recorded in the U-TOC sector 1 of a disc according to the above-described rules.

This display operation is carried out when the disc is loaded or reproduced. For example, when the disc 1 is loaded in the apparatus 30, the character information recorded as the disc name is displayed on the display portion 31 upon completion of the read-in of the data in the U-TOC.

During the reproduction of the disc 1, the character information recorded as the track name for the track being reproduced is displayed on the display portion 31.

To execute such display operations, the character information to be displayed is first read-in from the U-TOC data which has been read into the buffer memory 13 (F201).

A variable M is set to the number of the characters included in the read character information (F202). For example, the character information is "^GIRISIya^", the variable M is set equal to 10.

Thereafter, a variable n is set to 1 (F203), and a variable Z is set to the value of the variable n (F204). Therefore, the variable Z initially equals 1.

It is now determined whether the n-th character in the read character string is an identification character "^" or not. If it is not an identification character "^" and the variable n is not equal to the variable M (F206), the variable n is incremented and the process returns to step F205. In other words, this loop is a process to find the first identification character "^" in the character string.

If the character string includes no identification character "^" like the character string "ABC5de", the answer to step F205 is NO when the variable n takes values from 1 to 5. Since the number of the characters M is 6, n equals M at step F206 when it takes a value of 6. Then, the process proceeds to step F208 where the characters in the Z-th through n-th places are set as display data as they are and are transferred to the display portion 31, and the display portion 31 displays the character information. At this point, since the variable Z equals 1 and the variable n equals 6 at this time, characters "ABC5de" are displayed.

If the n-th character is an identification character "^", the process proceeds to step F209 to determine whether the variable Z equals the variable n or not. The variable Z equals the variable n when the first character of the character string is an identification character "^" as in the case of "^GIRISIya^".

The variable Z is not equal to the variable n when the identification character "^" is in the second place or a subsequent place as in the case of "ABC^AIU^" as shown at (b) in FIG. 13. When the identification character "^" is in the second place or a subsequent place, the characters preceding the identification character "^" are displayed as they are without being converted. Therefore, at step F210, the characters in the Z-th through (n−1)-th places are set as they are as display data. In the case of the character string "ABC^AIU^", the part of "ABC" is first set as display data directly.

If the n-th character is an identification character "^", the character string subsequent thereto may have been input as katakana characters. In this case, another identification character "^" should follow the character which has terminated the katakana input.

Then, a variable X is first set to the value of the variable n (F211). Therefore the variable X takes a value indicating the place of the identification character "^" at which the katakana input has been started. It is now determined whether the n-th character is an identification character "^" or not (F213) with the variable n incremented (F212).

If the case of a character string such as "ABC^DEF" which includes no character string sandwiched by identification characters "^", step F213 will never be answered by YES. Such a state is expected when the name input mode is terminated with the katakana character input mode still enabled. In such a case, the variable n equals the variable M at step F214 when the number of the characters M equals 7 and the variable n equals 7. Then, the process proceeds to step F215 to set and display the characters in the X-th through n-th places as display data. That is, "^DEF" is set as display data as it is. In this example, the character string "ABC" has already been set as display data at step F210. Therefore, the character string "ABC^DEF" is subjected to no change and will be displayed as character information on the display portion 31.

In the case of a character string such as "^GIRISIya^", the answer at the step F213 is YES when n equals 10. This means that there is a character string sandwiched by identification characters "^". The character string sandwiched by identification characters "^" is the characters in the (X+1)-th through (n−1)-th places. Then, step F216 checks this character string sandwiched by identification characters "^".

The checking process starts with the checking whether the number of the bytes of the character string is 80 or less. If it exceeds 80 bytes, since there is a rule that such a character string should not be converted into katakana characters, the characters in the X-th through n-th places including identification characters "^" are set as they are as display data at step F220.

If the number of the bytes is 80 or less, it is checked whether there is any portion that can not be converted into katakana characters according to the rule shown in FIG. 9. If there is such a portion, since there is a rule that such a portion should not be converted into katakana characters, the characters in the X-th through n-th places including identification characters "^" are set as they are as display data at step F220.

In the case of a character string "^GIRISIya^", the number of the bytes of the characters "GIRISIya" which are characters in the (X+1)-th through (n−1)-th places does not exceed 80 and there is no inconvertible portion. Then, at step F219, each of the characters in the (X+1)-th through (n−1)-th places is converted into a katakana character and is set as display data. Thus, characters "ギリシャ" are set as display data and are transferred to the display portion 31 which in turn displays the character information "ギリシャ".

It is determined at step F221 whether the variable n at this point is equal to the number of characters M or not. If yes, the process is terminated because the read character string has been entirely displayed. Those variables do not agree if there are further characters that follow the character string which has been read in from the U-TOC area. Then, the variable n is incremented (F222), and the variable Z is set to the value of the variable n (F223). The process then proceeds to step F205 to repeat the above-described steps.

For example, when the character strings as shown at (a) through (j) in FIG. 13 are recorded in the U-TOC area, they will be displayed as shown on the right-hand side of FIG. 13 through the above-described steps.

In the case of the example shown at (a) in FIG. 13, since there is no identification character "^", the characters "ABC5de" which have been recorded are displayed as they are through the process at step F208.

In the case of the example shown at (b) in FIG. 13, the first half "ABC" is set as display data at step F210, and the following part "^AIU^" is converted into "アイウ" and is set as display data at step F219. Thus, "ABCアイウ" is displayed.

In the case of the example shown at (c) in FIG. 13, "^KAKIKU^" is converted into "カキク" and set as display data at step F219; thereafter, the process returns through steps F221, F222, and F223 to step F205; and when the variable n equals the variable M, the characters in Z-th through n-th places, i.e., "XYZ" in this case, are set as display data as they are. Accordingly, the character information displayed on the display portion 31 is " カキク".

In the case of the example shown at (d) in FIG. 13, "^GIRISIya^" is converted into "ギリシャ" and set as display data at step F219. Therefore, the character information displayed on the display portion 31 is "ギリシャ".

In the case of the example shown at (e) in FIG. 13, "^GIRISYA^" is set as display data as it is without being converted at step F220 because the part of "SYA" can not be converted. Thus, the character information displayed on the display portion 31 is "^GIRISYA^".

In the case of the example shown at (f) in FIG. 13, "^GILISIya^" is set as display data as it is without being converted at step F220 because the part of "LI" can not be converted. Thus, the character information displayed on the display portion 31 is "^GILISIya^".

In the case of the example shown at (g) in FIG. 13 wherein the portion sandwiched by identification characters "^" exceeds 80 bytes, the data is set as display data as it is at step F220. Thus, the character information displayed on the display portion 31 is "^AIUEO . . . RARIRURERO^".

In the case of the example shown at (h) in FIG. 13, only the part of "AIUEO . . . RA" is sandwiched by identification characters "^". First, this part is converted into "アイウエオ . . . ラ" and is set as display data at step F219 and, thereafter, "RIRURERO" is set as display data at step F208.

In the case of the example shown at (i) in FIG. 13, each of "AIUEO . . . RA" and "RIRURERO" is sandwiched by identification characters "^". First, "AIUEO . . . RA" is converted into "アイウエオ . . . ラ" and is set as display data at step F219. Then, the process at step F219 converts "RIRURERO" into "リルレロ" and sets it as display data to be output. As a result, the character information displayed on the display portion 31 will be all katakana characters.

In the case of the example shown at (j) in FIG. 13, "^ABC^" can not be converted and is set as display data as it is at step F220; the subsequent part "ABC" is set as display data as it is at step F210; and "^ABE^" is converted into "アベ" and is set as display data at step F219. Thus, the character information displayed on the display portion 31 is "^ABC^ABCアベ".

Figure 14:
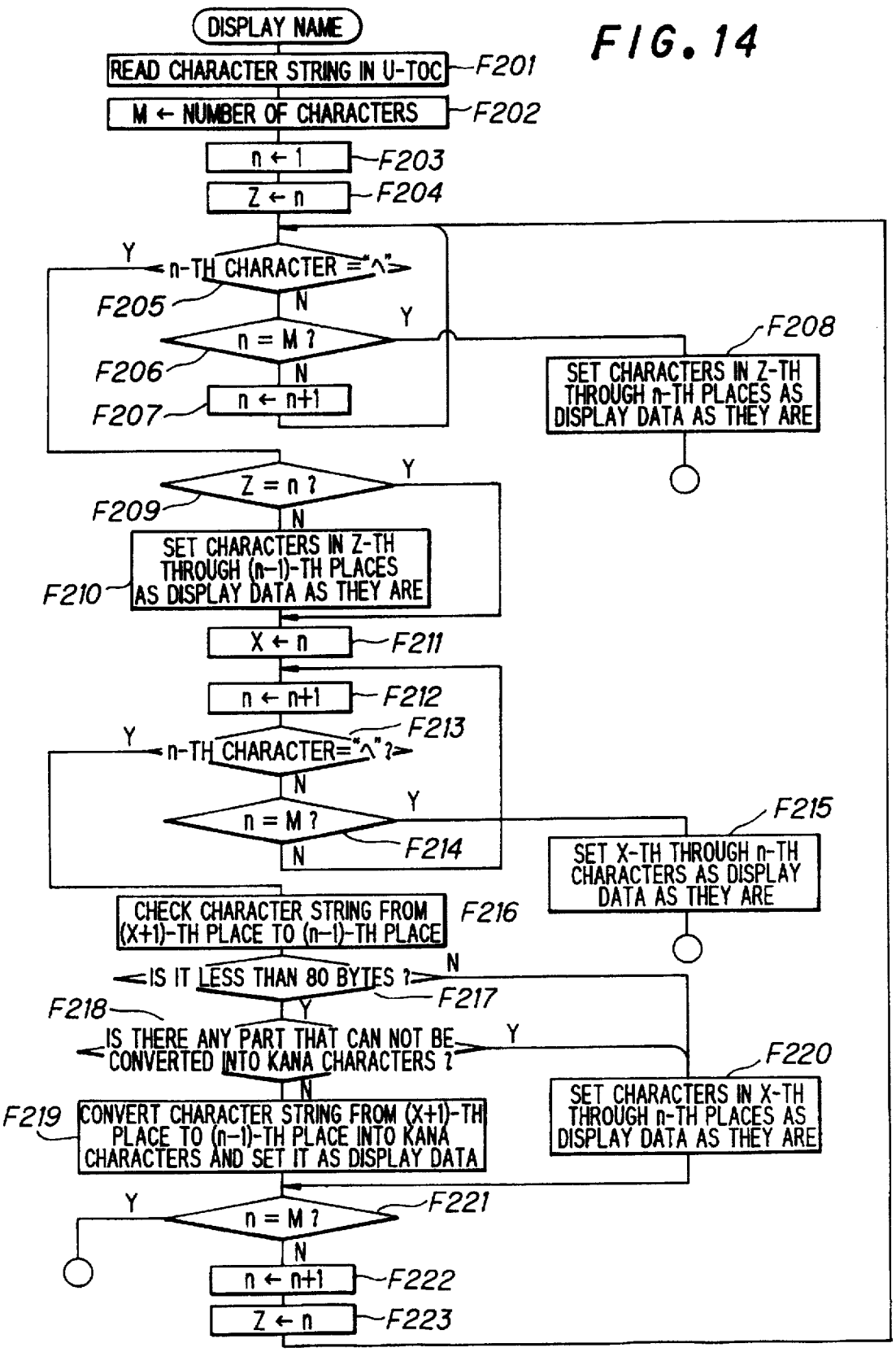
FIG. 14 is a flow chart for the process in the character information reproducing operation of the embodiment of the invention.

The display of recorded character data by the process shown in FIG. 14 and as described above will provide the display in katakana characters on the display portion 31 for characters which have been input using katakana characters in the process shown in FIG. 12. If recording is performed according to the process shown in FIG. 12, any character string recorded in the U-TOC area will not be displayed as a character string like those indicated by (e), (f), (g), and (j) in FIG. 13. Therefore, a katakana input will never be disabled from being displayed in katakana characters because of the impossibility of conversion or excess of the number of bytes.

It goes without saying that actual processing is not limited to the examples shown in FIG. 14 but can be carried out in various procedures.

The above-described character information recording and reproducing operations according to the present invention allows a user to display characters which are more readable than alphabets. Since only ASCII codes are recorded, there is no need for storing special codes to be exclusively used for katakana characters and the like. Accordingly, there will be no significant increase in the storage capacity required. When conversion can not be performed, ASCII codes are displayed as they are. This eliminates the possibility that recorded characters are displayed as different characters in a garbled way.

Since conversion between katakana characters and alphabets is performed on a on-to-one basis, it is possible to construct a simple conversion algorithm which causes no confusion. This makes it easy to create software and to maintain compatibility.

Further, an arrangement is made so that the number of the bytes of a character string to be converted sandwiched by identification does not exceed a predetermined value during to make a display process easier. A great number of bytes make a process to determine convertibility of each character more complicated and can degrade the response display output. If the number of bytes is limited, code processing and conversion algorithm can be simplified.

Since the number of characters that can be displayed on the display portion 31 at a time is limited, a long character string is divided into parts using identification characters "^". An arrangement may be made so that the a kana-conversion process can be performed on the second character string sandwiched by identification characters "^" while the first character string sandwiched by identification characters "^" is displayed after being converted into katakana characters. That is, time processing time before display can be shortened.

Further, any delay in a display process can be avoided by inhibiting conversion when the number of the bytes of a character string sandwiched by identification characters "^" exceeds a predetermined value and when a character string includes any part that can not be converted.

A user is inhibited from inputting the identification character "^" during recording to prevent the identification character "^" from being added to a character string to be recorded in violation of the rule. This eliminates the possibility that a character string sandwiched by identification characters "^" can not be converted into katakana characters.

The above-described embodiment allows display which is easy to read, especially for a Japanese, by employing an arrangement wherein katakana characters are converted into ASCII codes when recorded on a disc and wherein ASCII codes are converted into katakana characters for display. However, the present invention is not limited to katakana characters and can be modified to allow conversion into hiragana characters.

In addition, if an arrangement is made to allow the conversion of Hangul alphabets, Greek letters, Arabic characters, etc. into alphabets on a one-to-one basis, various local characters around the world can be recorded and displayed by recording them using only ASCII codes.

To accommodate various kinds of characters, for example, different identification characters may be employed to allow them to be distinguished. For example, a technique may be employed in which "^" as described above and "@" are used as the identification characters for katakana characters and Hangul alphabets, respectively.

Further, a certain character string such as "JJJ" and "**" may be used as an identification character.

While a specific illustrated embodiment has been shown and described, it will be appreciated by those skilled in the art that various modifications, changes and additions can be made to the invention without departing from the spirit and scope thereof as set forth in the following claims.

What is claimed is:

1. An apparatus for recording on and/or reproducing from a recording medium having a code area in which character code data for outputting character information associated with the information recorded in a recording area can be recorded, comprising:

an input means for inputting character information;

a conversion means for converting each character in the character information input by said input means into character code data, said conversion means adding an identifier to the character code data during the conversion, said identifier indicating that the type of the characters in a character string in the character information input by said input means is different from that of the character string precedent thereto; and a recording and/or reproducing means to which the character code data from said conversion means is supplied, for recording and/or reproducing information and character code data on and/or from the recording medium.

2. The apparatus for recording on and/or reproducing from a recording medium according to claim 1, further comprising a decoding means for decoding the character code data read from a recording medium by said recording and/or reproducing means into character information, said decoding means performing a decoding process based on the identifier added to the read character code data.

3. The apparatus for recording on and/or reproducing from a recording medium according to claim 2, wherein if it is determined that said identifier added to the read character code data is not added in a pair to the character code data, said decoding means outputs at least the character code data that follows the identifier among the read character code data as it is.

4. The apparatus for recording on and/or reproducing from a recording medium according to claim 2, wherein if it is determined that said read character code data can not be decoded, said decoding means outputs said read character code data as it is.

5. The apparatus for recording on and/or reproducing from a recording medium according to claim 2, wherein if the length of the data at the portion of said read character code data which is sandwiched by said identifier provided in a pair is longer than a predetermined data length, said decoding means outputs the portion of said read character code data which is sandwiched by said identifier provided in a pair as it is.

6. The apparatus for recording on and/or reproducing from a recording medium according to claim 2, wherein only if it is determined that the data at the portion of said read character code data which is sandwiched by said identifier provided in a pair has a length equal to or shorter than the predetermined data and can be converted, said decoding means converts the data at the portion of said read character code data which is sandwiched by said identifier provided in a pair into characters of a type which is different from the type of other portions of said read character code data.

7. The apparatus for recording on and/or reproducing from a recording medium according to claim 1, wherein when new character code data is added to the character code data which has been already been recorded on the recording medium and an identifier is to be added to the newly added character code data, said decoding means adds an identifier which is different from the identifier for said recorded character code data.

8. A method for recording on and/or reproducing from a recording medium having a code area in which character code data for outputting character information associated with the information recorded in a recording area can be recorded, comprising the steps of:

inputting character information using an input means;

converting each character in the character information input by said input means into character code data and adding an identifier to the character code data during the conversion, said identifier indicating that the type of the characters in a character string in the input character information is different from that of the character string precedent thereto; and recording the character code data added with the identifier on the recording medium.

9. The method for recording on and/or reproducing from a recording medium according to claim 8, wherein a decoding process is performed based on the identifier added to the character code data read from the recording medium.

10. The method for recording on and/or reproducing from a recording medium according to claim 8, wherein if it is determined that the identifier added to the character code data read from the recording medium is added in a pair to the character code data, the read character code data is decoded into character information and output and wherein if it is determined that said identifier added to the read character code data is not added in a pair to the character code data, at least the character code data that follows the identifier among the read character code data is output as it is.

11. The method for recording on and/or reproducing from a recording medium according to claim 8, wherein if it is determined that character code data read from the recording medium can not be decoded, said read character code data is output as it is.

12. The method for recording on and/or reproducing from a recording medium according to claim 8, wherein if the length of the data at the portion of the character code data read from the recording medium which is sandwiched by said identifier provided in a pair is longer than a predetermined data length, the portion of said read character code data which is sandwiched by said identifier provided in a pair is output as it is.

13. The method for recording on and/or reproducing from a recording medium according to claim 8, wherein only if it is determined that the data at the portion of character code data read from the recording medium which is sandwiched by said identifier provided in a pair has a length equal to or shorter than the predetermined data and can be converted, the data at the portion of said read character code data which is sandwiched by said identifier provided in a pair is converted into characters of a type which is different from the type of other portions of said read character code data.

14. The method for recording on and/or reproducing from a recording medium according to claim 8, wherein when new character code data is added to the character code data which has been already been recorded on the recording medium and an identifier is to be added to the newly added character code data, an identifier which is different from the identifier for said recorded character code data is added.

15. An apparatus for recording on and/or reproducing from a recording medium having a code area in which character code data for displaying character information associated with the information recorded in a recording area can be recorded, comprising:

an input means for inputting plural pieces of character information of different kinds;

a conversion means for converting each character in the character information input by said input means into character code data, said conversion means adding an identifier to the character code data during the conversion, said identifier indicating that a character string in the character information input by said input means consists of kana characters unlike the character string precedent thereto; and a recording and/or reproducing means to which the character code data from said conversion means is supplied, for recording and/or reproducing information and character code data on and/or from the recording medium.

16. The apparatus for recording on and/or reproducing from a recording medium according to claim 15, further comprising a decoding means for decoding the character code data read from a recording medium by said recording and/or reproducing means into character information, said decoding means performing a decoding process based on the identifier added to the read character code data.

17. The apparatus for recording on and/or reproducing from a recording medium according to claim 16, wherein if it is determined that said identifier added to the read character code data is not added in a pair to the character code data, said decoding means outputs at least the character code data that follows the identifier among the read character code data as it is.

18. The apparatus for recording on and/or reproducing from a recording medium according to claim 16, wherein if it is determined that said read character code data can not be decoded, said decoding means outputs said read character code data as it is.

19. The apparatus for recording on and/or reproducing from a recording medium according to claim 16, wherein if the length of the data at the portion of said read character code data which is sandwiched by said identifier provided in a pair is longer than a predetermined data length, said decoding means outputs the portion of said read character code data which is sandwiched by said identifier provided in a pair as it is.

20. The apparatus for recording on and/or reproducing from a recording medium according to claim 16, wherein only if it is determined that the data at the portion of said read character code data which is sandwiched by said identifier provided in a pair has a length equal to or shorter than the predetermined data and can be converted, said decoding means converts the data at the portion of said read character code data which is sandwiched by said identifier provided in a pair into kana characters.

21. The apparatus for recording on and/or reproducing from a recording medium according to claim 15, wherein when new character code data is added to the character code data which has been already been recorded on the recording medium and an identifier is to be added to the newly added character code data, said decoding means adds an identifier which is different from the identifier for said recorded character code data.

* * * * *